United States Patent [19]

Senshu

[11] Patent Number: 5,418,768
[45] Date of Patent: May 23, 1995

[54] DISC-SHAPED RECORDING MEDIUM AND APPARATUS FOR REPRODUCING TRACK ADDRESSES RECORDED ON THE DISC-SHAPED RECORDING MEDIUM

[75] Inventor: Susumu Senshu, Kanagawa, Japan

[73] Assignee: Sony Corporation, Tokyo, Japan

[21] Appl. No.: 210,081

[22] Filed: Mar. 17, 1994

Related U.S. Application Data

[63] Continuation of Ser. No. 889,666, May 28, 1992, abandoned.

[30] Foreign Application Priority Data

Jun. 7, 1991 [JP] Japan .................. 3-162511

[51] Int. Cl.$^6$ ............................. G11B 15/52
[52] U.S. Cl. .................. 369/59; 369/275.3
[58] Field of Search ............. 369/59, 32, 50, 54, 369/275.3; 360/78.01, 78.04, 78.08, 78.14, 77.08

[56] References Cited

U.S. PATENT DOCUMENTS

| | | | |
|---|---|---|---|
| 4,677,606 | 6/1987 | Ogata et al. | 369/59 |
| 4,823,212 | 4/1989 | Knowles et al. | 360/77.08 |
| 4,924,160 | 5/1990 | Tung | 360/78.07 |
| 4,925,717 | 5/1990 | Tsukamura et al. | |

FOREIGN PATENT DOCUMENTS

0404942A1  1/1991  European Pat. Off. ..... G11B 21/10

Primary Examiner—Georgia Y. Epps
Assistant Examiner—P. W. Huber
Attorney, Agent, or Firm—Limbach & Limbach; Philip M. Shaw, Jr.

[57] ABSTRACT

A disc-shaped recording medium in which concentric recording tracks or a spiral recording track is divided circumferentially to form a number of sectors in each of which track addresses are pre-recorded, wherein each position of the track address is formed by a base-m Gray code, and wherein each position is sequentially formed so that the Gray code of positive or negative logic and a negative logic is used for the upper order digit having the value of an even or odd number and the upper order digit having the value of an odd number, respectively.

8 Claims, 7 Drawing Sheets

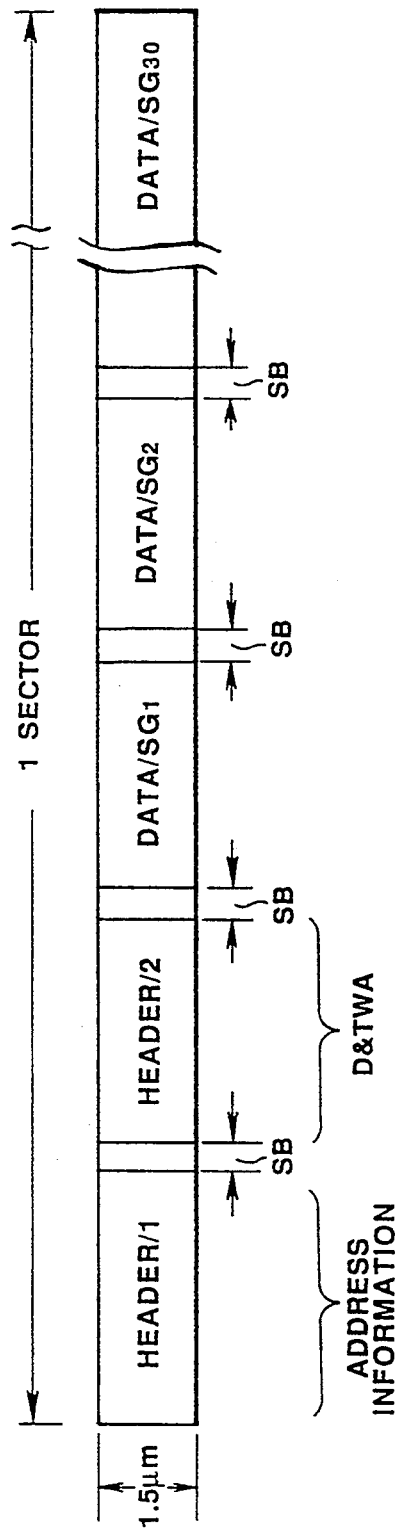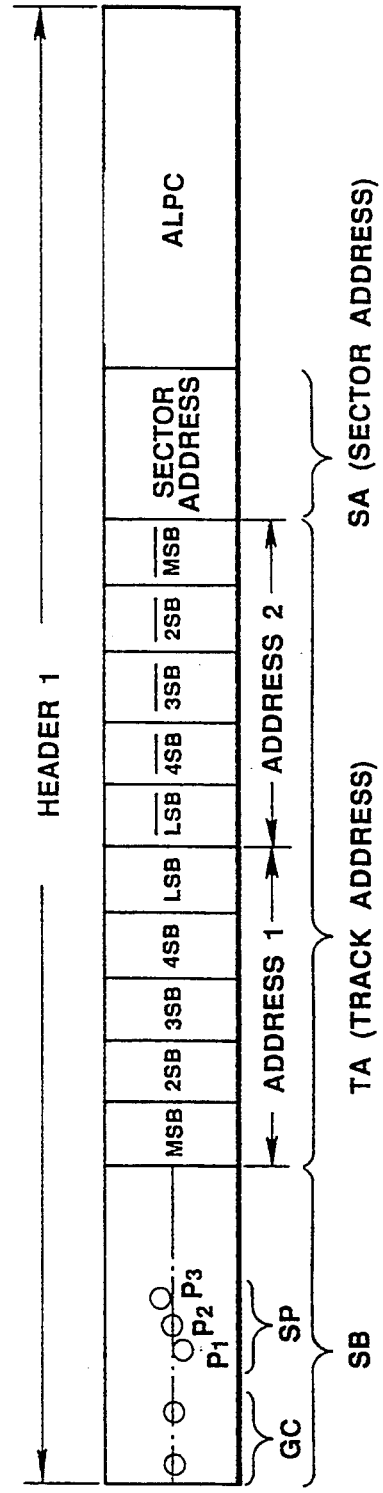

| VALUES | 1 | 2 | 3 | 4 |
|---|---|---|---|---|
| 0 | O | | O | |
| 1 | O | | | O |
| 2 | | O | | O |
| 3 | | O | O | |

FIG. 3(a)

| VALUES | 1 | 2 | 3 | 4 |
|---|---|---|---|---|
| 0 | | O | O | |
| 1 | | O | | O |
| 2 | O | | | O |
| 3 | O | | O | |

FIG. 3(b)

| | 1 | 2 | 3 | 4 | 5 | 6 | 7 | 8 |
|---|---|---|---|---|---|---|---|---|
| 0 | O | | | | | O | | |
| 1 | O | | | | O | | | |
| 2 | | O | | | O | | | |
| 3 | | O | | | | O | | |
| 4 | | | O | | | O | | |
| 5 | | | O | | | | O | |
| 6 | | O | | | | | O | |
| 7 | O | | | | | | O | |

FIG. 5(a)

| | 1 | 2 | 3 | 4 | 5 | 6 | 7 | 8 |
|---|---|---|---|---|---|---|---|---|
| 0 | O | | | | | | O | |
| 1 | | O | | | | | O | |
| 2 | | | O | | | | O | |
| 3 | | | O | | | O | | |
| 4 | | O | | | | O | | |
| 5 | | O | | | O | | | |
| 6 | O | | | | O | | | |
| 7 | O | | | | | O | | |

FIG. 5(b)

| | MSB | | | | 2SB | | | | 3SB | | | | 4SB | | | | LSB | | | |
|---|---|---|---|---|---|---|---|---|---|---|---|---|---|---|---|---|---|---|---|---|
| | 1 | 2 | 3 | 4 | 1 | 2 | 3 | 4 | 1 | 2 | 3 | 4 | 1 | 2 | 3 | 4 | 1 | 2 | 3 | 4 |
| 0 | ○ | ○ | | | ○ | ○ | | | ○ | ○ | | | ○ | ○ | | | ○ | ○ | | |
| 1 | ○ | ○ | | | ○ | ○ | | | ○ | ○ | | | ○ | ○ | | | ○ | | | ○ |
| 2 | ○ | ○ | | | ○ | ○ | | | ○ | ○ | | | ○ | ○ | | | | | ○ | ○ |
| 3 | ○ | ○ | | | ○ | ○ | | | ○ | ○ | | | ○ | ○ | | | | | ○ | ○ |
| 4 | ○ | ○ | | | ○ | ○ | | | ○ | ○ | | | ○ | | | ○ | | | ○ | ○ |
| 5 | ○ | ○ | | | ○ | ○ | | | ○ | ○ | | | ○ | | | ○ | | ○ | | ○ |
| 6 | ○ | ○ | | | ○ | ○ | | | ○ | ○ | | | ○ | | | ○ | ○ | | | ○ |
| 7 | ○ | ○ | | | ○ | ○ | | | ○ | ○ | | | ○ | | | ○ | ○ | | ○ | |
| 8 | ○ | ○ | | | ○ | ○ | | | ○ | ○ | | | | ○ | | ○ | ○ | | ○ | |
| 9 | ○ | ○ | | | ○ | ○ | | | ○ | ○ | | | | ○ | | ○ | ○ | | | ○ |
| 10 | ○ | ○ | | | ○ | ○ | | | ○ | ○ | | | | ○ | | ○ | | | ○ | ○ |
| 11 | ○ | ○ | | | ○ | ○ | | | ○ | ○ | | | | ○ | | ○ | | | ○ | ○ |
| 12 | ○ | ○ | | | ○ | ○ | | | ○ | ○ | | | | ○ | ○ | | | | ○ | ○ |
| 13 | ○ | ○ | | | ○ | ○ | | | ○ | ○ | | | | ○ | ○ | | | | ○ | ○ |
| 14 | ○ | ○ | | | ○ | ○ | | | ○ | ○ | | | | ○ | ○ | | ○ | | | ○ |
| 15 | ○ | ○ | | | ○ | ○ | | | ○ | | ○ | | | ○ | ○ | | ○ | | ○ | |
| 16 | ○ | ○ | | | ○ | ○ | | | ○ | | | ○ | | ○ | ○ | | ○ | | ○ | |
| 17 | ○ | ○ | | | ○ | ○ | | | ○ | | | ○ | | ○ | ○ | | ○ | | | ○ |
| 18 | ○ | ○ | | | ○ | ○ | | | ○ | | | ○ | | ○ | ○ | | | | ○ | ○ |
| 19 | ○ | ○ | | | ○ | ○ | | | ○ | | | ○ | | ○ | ○ | | | | ○ | ○ |
| 20 | ○ | ○ | | | ○ | ○ | | | ○ | | | ○ | | ○ | | ○ | | | ○ | ○ |
| 21 | ○ | ○ | | | ○ | ○ | | | ○ | | | ○ | | ○ | | ○ | | ○ | | ○ |
| 22 | ○ | ○ | | | ○ | ○ | | | ○ | | | ○ | | | ○ | ○ | ○ | | | ○ |
| 23 | ○ | ○ | | | ○ | ○ | | | ○ | | | ○ | ○ | | | ○ | ○ | | ○ | |
| 24 | ○ | ○ | | | ○ | ○ | | | ○ | | | ○ | ○ | | | ○ | ○ | | ○ | |
| 25 | ○ | ○ | | | ○ | ○ | | | ○ | | | ○ | ○ | | | ○ | ○ | | | ○ |
| 26 | ○ | ○ | | | ○ | ○ | | | ○ | | | ○ | ○ | | | ○ | | | ○ | ○ |
| 27 | ○ | ○ | | | ○ | ○ | | | ○ | | | ○ | ○ | | | ○ | | | ○ | ○ |
| 28 | ○ | ○ | | | ○ | ○ | | | ○ | | | ○ | ○ | | ○ | | | | ○ | ○ |
| 29 | ○ | ○ | | | ○ | ○ | | | ○ | | | ○ | ○ | | ○ | | | | ○ | ○ |
| 30 | ○ | ○ | | | ○ | ○ | | | ○ | | | ○ | ○ | | ○ | | ○ | | | ○ |
| 31 | ○ | ○ | | | ○ | ○ | | | ○ | | | ○ | ○ | | ○ | | ○ | | ○ | |
| 32 | ○ | ○ | | | ○ | ○ | | | | | ○ | ○ | ○ | | ○ | | ○ | | ○ | |
| 33 | ○ | ○ | | | ○ | ○ | | | | | ○ | ○ | ○ | | ○ | | ○ | | | ○ |
| 34 | ○ | ○ | | | ○ | ○ | | | | | ○ | ○ | ○ | | ○ | | | | ○ | ○ |
| 35 | ○ | ○ | | | ○ | ○ | | | | | ○ | ○ | ○ | | ○ | | | | ○ | ○ |
| 36 | ○ | ○ | | | ○ | ○ | | | | | ○ | ○ | ○ | | | ○ | | | ○ | ○ |

| VALUES (WORDS) | | | | |
|---|---|---|---|---|
| 0 | ○ | | | |
| 1 | | ○ | | |
| 2 | | | ○ | |
| 3 | | | | ○ |

FIG. 8(b)

| VALUES (WORDS) | | | | |
|---|---|---|---|---|
| 0 | | | | ○ |
| 1 | | | ○ | |
| 2 | | ○ | | |
| 3 | ○ | | | |

FIG. 8(c)

| | MSB | 2SB | 3SB | 4SB | LSB |
|---|---|---|---|---|---|
| 1 | ○ | ○ | ○ | ○ | ○ |
| 2 | ○ | ○ | ○ | ○ | ○ |
| 3 | ○ | ○ | ○ | ○ | ○ |
| 4 | ○ | ○ | ○ | ○ | ○ |
| 5 | ○ | ○ | ○ | ○ | ○ |
| 6 | ○ | ○ | ○ | ○ | ○ |
| 7 | ○ | ○ | ○ | ○ | ○ |
| 8 | ○ | ○ | ○ | ○ | ○ |
| 9 | ○ | ○ | ○ | ○ | ○ |
| 10 | ○ | ○ | ○ | ○ | ○ |
| 11 | ○ | ○ | ○ | ○ | ○ |
| 12 | ○ | ○ | ○ | ○ | ○ |
| 13 | ○ | ○ | ○ | ○ | ○ |
| 14 | ○ | ○ | ○ | ○ | ○ |
| 15 | ○ | ○ | ○ | ○ | ○ |
| 16 | ○ | ○ | ○ | ○ | ○ |
| 17 | ○ | ○ | ○ | ○ | ○ |
| 18 | ○ | ○ | ○ | ○ | ○ |
| 19 | ○ | ○ | ○ | ○ | ○ |
| 20 | ○ | ○ | ○ | ○ | ○ |
| 21 | ○ | ○ | ○ | ○ | ○ |
| 22 | ○ | ○ | ○ | ○ | ○ |
| 23 | ○ | ○ | ○ | ○ | ○ |
| 24 | ○ | ○ | ○ | ○ | ○ |
| 25 | ○ | ○ | ○ | ○ | ○ |
| 26 | ○ | ○ | ○ | ○ | ○ |

DISC-SHAPED RECORDING MEDIUM AND APPARATUS FOR REPRODUCING TRACK ADDRESSES RECORDED ON THE DISC-SHAPED RECORDING MEDIUM

This is a continuation of application Ser. No. 07/889,666, filed on May 28, 1992, now abandoned.

BACKGROUND OF THE INVENTION

1. Field of the Invention

This invention relates to a disc-shaped recording medium in which a recording track(s) are divided circumferentially to form a plurality of sectors in each of which track addresses are pre-recorded, and an apparatus for reproducing the track addresses on the disc-shaped recording medium.

2. Description of the Prior Art

Heretofore, an optical disc having a disc substrate at least one major surface of which is provided with a recording layer which is responsive to light to record information signals thereon, and an optical recording and/or reproducing apparatus having the optical disc as a recording medium, have been put to practical use.

As this type of the optical disc, the playback-only ROM disc (CD) and the magneto-optical disc on which data can be re-written by the user, are well-known.

The above-mentioned magneto-optical disc is usually provided with concentric recording tracks or a spiral recording track in its recording region, which track(s) are divided circumferentially for dividing each track turn into plural sectors.

Data recorded in each sector are divided into e.g. 32 segments, as shown in FIG. 1a. The leading end of each segment is formed as a servo byte area (SB) in which sample servo pits are pre-recorded, such as by embossing.

An address information is recorded in a header/1 at the leading end of each sector, and an automatic laser power control area (ALPC area) is provided in the trailing side of each sector. A test-write area for tentative data writing is provided in the next header/2.

The header/2 is followed by 30 segments $S_{G1}$ to $S_{G30}$, capable of recording input data.

As shown to an enlarged scale in FIG. 1b, the header/1 is provided first with the servo byte area SB, followed by a track address TA consisting of a 10-byte word, indicating a track address, and by a 2-byte sector address SA, indicating a sector mark.

In the servo byte area SB of each segment in each track, there is provided a hexadecimal Gray code GC, indicating the relative position of the track, for being used as an access code when the code is traversed by an optical head. In the servo byte area, there are also provided wobbling pits $P_1$ and $P_3$, providing the tracking information for the optical head, and a clock pit $P_2$ for providing the clocking information.

As data indicating the track address in the header/1, 5-word data, i.e. 5 bytes of data, including the most significant bytes (MSB), the second most significant bytes (2SB), the third most significant bytes (3SB), the fourth most significant bytes (4SB), and the least significant bytes (LSB) of data are recorded as a track address 1. Meanwhile, parity check words which are complements relative to these five words are recorded as a track address 2 in continuation to these words.

When a desired track on the optical disc, on which the above-mentioned address information is recorded, is accessed, starting from the current track, the current traversing position may be grasped by reading the track address at the leading end of each sector and then the Gray code at the leading end of each segment indicating the lower order bits of the track address.

As the optical head becomes increasingly lightweight and the seek speed is increased, it has become possible for a laser beam to traverse the optical head radially at an increased velocity, so that it has become difficult to correctly read out the track address which is recorded in the header/1 and met in the course of a seeking operation. If the track address is misread, accessing cannot be achieved smoothly, so that it becomes impossible to achieve the high speed seeking.

On the other hand, if the absolute address of the track at the end of the seeking cannot be read, smooth landing on the target track is inhibited to lengthen the seeking time.

It has been attempted to record part of the address information recorded on the header/1 by the Gray code so that the track position will not be different significantly on occurrence of data readout errors. However, there is still the risk that the track position may be mistaken significantly when the optical head traverses the track where a bit shift in the higher position direction or in the lower position direction occurs between the track address words.

OBJECT AND SUMMARY OF THE INVENTION

It i s an object of the present invention to provide an optical disc in which the address information can be read satisfactorily even when the track is traversed at an increased rate.

A disc-shaped recording medium according to the present invention comprises a recording surface having one of either concentric recording tracks or a spiral recording track, each track being divided circumferentially to form a plurality of sectors in each of which track addresses are pre-recorded, wherein each digit of the track address is formed by a base-m Gray code, and each digit is sequentially formed so that a Gray code of positive logic is used where a next highest order digit has the value of an even number and a Gray code of negative logic is used where the next highest order digit has the value of an odd number.

Alternatively, each digit can be sequentially formed so that a Gray code of positive logic is used where a next highest order digit has the value of an odd number and a Gray code of negative logic is used where the next highest order digit has the value of an even number.

The result is that, when a track in which there is a word shift towards an upper position or towards a lower position is traversed during seeking, there is no risk that the read-out absolute position of the track differs significantly to assure high speed accessing.

Another embodiment of the invention is an apparatus for reproducing a disc-shaped recording medium in which each one of a plurality of concentric recording tracks or a spiral recording track is divided circumferentially to form a plurality of sectors, in which each digit of a track address is formed by a base-m Gray code, and in which each digit is sequentially formed so that a Gray code of positive logic is used where a next highest order digit has the value of an even number and a Gray code of negative logic is used where the next highest order digit has the value of an odd number. The apparatus includes means for reproducing the Gray code from the disc-shaped recording medium, an address decoder supplied with the reproduced Gray code for converting the reproduced Gray code into binary address code, and address code detection means for detecting the address code obtained from the address decoder for each digit, inverting the address code when a detected lowest order bit of the next highest digit is an odd number, and outputting a track address.

Alternatively, a Gray code of positive logic can be used where a next highest order digit has the value of an odd number and a Gray code of negative logic can be used where the next highest order digit has the value of an even number. In such case, the address code detection means detects the address code obtained from the address decoder for each digit, inverts the address code when a detected lowest order bit of the next highest digit is an even number, and outputs a track address.

Yet further embodiments of the invention are the respective combinations of the disc-shaped recording mediums and the reproducing apparatuses described above.

Other objects and advantages of the present invention will become apparent from the following description.

BRIEF DESCRIPTION OF THE DRAWINGS

FIGS. 1(a) and 1(b) are illustrative views showing a data array in a track of an optical disc according to the present invention.

FIGS. 3(a) and 3(b) is a pattern diagrams showing a 4-base positive and negative Gray code data array.

FIG. 4 is an illustration of a 5 word track address with a base-4 Gray code;

FIG. 5(a) and 5(b) are illustrations of bit arrays when a base-8 Gray code in the form of 2 out of 8 is used;

FIGS. 8(a), 8(b) and 8(c) show a pattern showing a modified embodiment of encoding the track address by the Gray code.

DETAILED DESCRIPTION OF THE PREFERRED EMBODIMENTS

Figure 2:
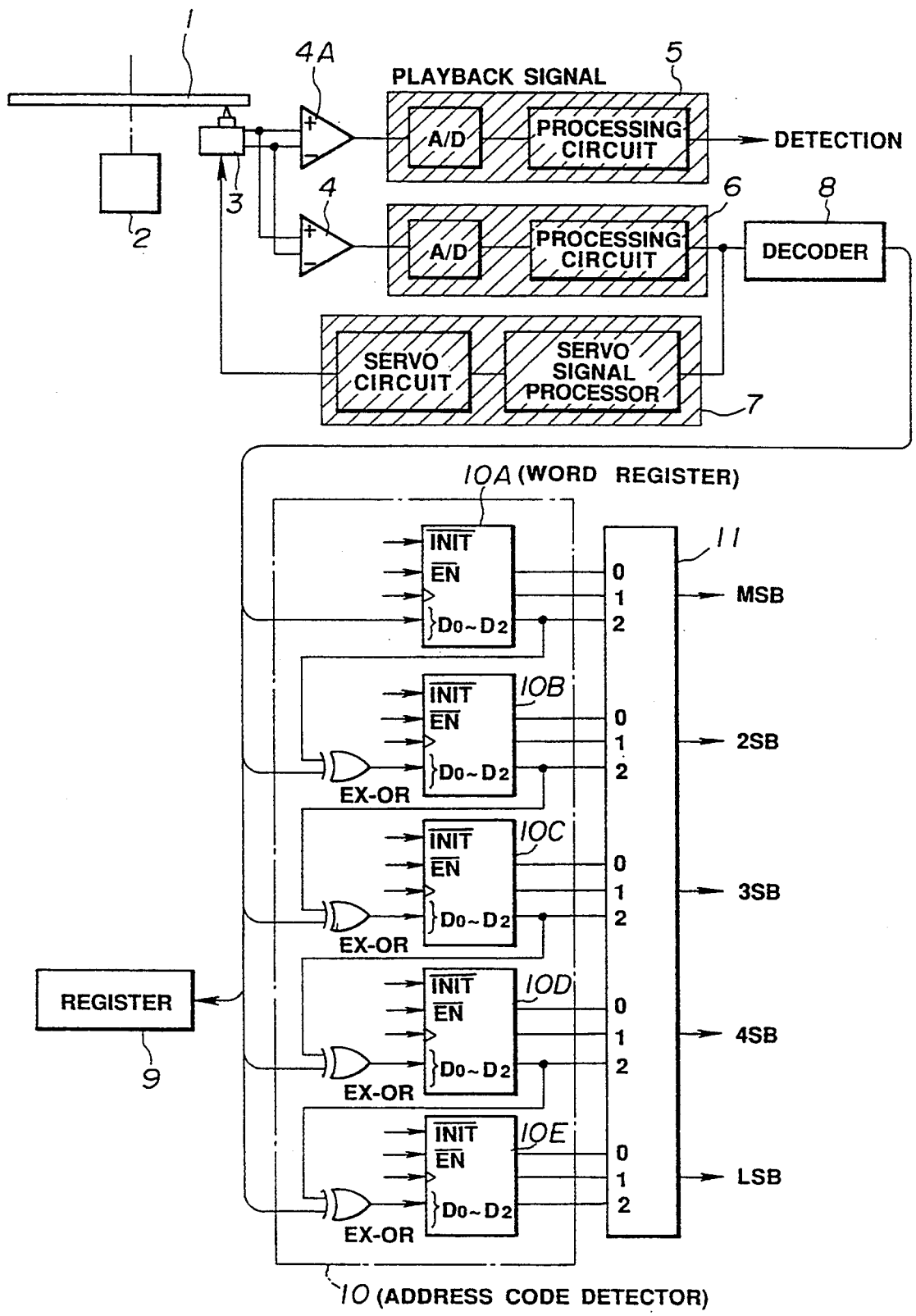
FIG. 2 is a block circuit diagram showing a readout circuit for reading out the track addresses recorded on an optical disc.

FIG. 2 shows, in a block circuit diagram, a reproducing system of a magneto-optical disc recording/reproducing apparatus for reading out the track addresses of the present invention provided in the sector address area. As a magneto-optical disc 1 is rotationally driven by a spindle motor 2 at a constant angular velocity, a laser beam is radiated by an optical head 3 on the magneto-optical disc 1 for reading out the track of the magneto-optical disc based on the reflected light from the disc. The optical head 3 is tracking-and-focusing-controlled by control signals, not shown.

A magnetic head, also not shown, is provided facing the major surface of the disc opposite to the major surface faced by the optical head 3 to enable data recording in a known manner.

4A is an amplifier for amplifying playback MO-RF signals outputted from a detector (not shown). Recording data portions of the playback MO-RF signals are transmitted to a playback signal processing circuit 5.

The playback signal processing circuit 5 takes charge of data extraction, generation of read clock signals and a variety of signal processing operations for demodulating the recording data.

The playback RF signals, obtained by the header/1 and the embossed pits of the servo byte area SB, are extracted via an amplifier 4 by a signal extracting section 6, constituted by a sample-and-hold circuit (not shown), while the servo information reproduced from the respective servo byte areas SB is supplied to a servo circuit 7 for producing tracking error signals and focusing error signals for generating control signals controlling an object lens, an actuator etc. (all not shown) of the optical head 3.

The extracting section 6 and the servo circuit 7 are connected to supply outputs to the input of a decoder 8. The Gray code recorded in the servo byte area is detected and the detected data is decoded by the decoder 8 to form access data counting the number of tracks being traversed. The track address data recorded on the header/1 is supplied to decoder 8 where it is converted into binary number code data.

That is, the 4-bit access code data reproduced from servo byte area SB is supplied from the decoder 8 as traverse signals to a register 9, whilst 5-word track address data recorded in the header/1 is entered from the decoder 8 into an address code detector 10. The track address data is fetched by control signals into word registers 10A to 10E corresponding to the respective words and a comprehensive output of the word registers 10A to 10E is latched by a radial address register 11 so as to be taken out as 5-byte track address data, including the most significant bytes (MSB), the second most significant bytes (2SB), the third most significant bytes (3SB), the fourth most significant bytes (4SB), and the least significant bytes (LSB). A desired track jump is executed on the basis of these track address data.

The manner in which the track address detected by the above-described apparatus is encoded with the Gray code, is hereinafter explained.

FIG. 3a shows an example of a 4-base Gray code in a 2 out of 4 form. That is, the values 0 to 3 are of a bit array in which a shift of only one bit occurs between adjacent values.

FIG. 3b similarly shows a 4-base Gray code which corresponds to the Gray code of FIG. 3a constituted by a negative logic.

With the optical disc of the present invention, the above-mentioned Gray code of the positive logic a and that of the negative logic b are utilized to provide a Gray code pattern on the whole.

FIG. 4 shows an example of 5-word track address with the above-mentioned base-4 Gray code. The gray code patterns shown in FIG. 3 are used in each of the bytes MSB, 2SB, 3SB, 4SB and LSB, so that 45 track addresses may be generated.

When the next upper order of magnitude byte with respect to a given byte is an odd number, the base 4 Gray code pattern indicates that the given byte is a negative logic Gray code pattern.

For example, FIG. 3(a) shows the values of the bit pattern for a positive Gray code logic. Referring to FIG. 4, the bit patterns for tracks 4 to 7 and 12 to 15 for the 4SB digit of the track address have values of 1 to 3 (compare the values for the corresponding bit patterns with FIG. 3(a), which are odd numbers. The next lower number in the sequence of number forming the track address, i.e. LSB, is therefor of a negative logic Gray code pattern.

In a similar manner, since the 3SB Gray code for the track addresses 16 to 31 indicate 1 (odd number), the 4SB on the lower order side thereof is of the negative logic Gray code pattern.

In this manner, when the value of a word of a byte is an odd number, the Gray code of the byte at the lower order side thereof is of the negative logic, so that the track addresses in their entirety may be expressed by the Gray code.

It is to be noted that the words of the respective bytes are also of the Gray code patterns.

FIGS. 5(a) and 5(b) show bit arrays when the base-8 Gray code in the form of 2 out of 8 is used in place of the above-mentioned base-4 Gray code. Thus, FIGS. 5a and 5b indicate examples of the positive and negative logic Gray code patterns, respectively.

If the 5 byte track addresses are indicated by the Gray code shown in FIG. 4, it becomes possible to designate $8^5$ track positions.

The address code detector 10, shown in FIG. 2, detects the track addresses indicated by the 5 base-8 Gray code words MSB, 2SB, 3SB, 4SB and LSB.

The address information read out during seeking of the optical disc is converted by decoder 8 into 3-bit binary code data $D_0$ to $D_2$.

The binary code data indicating the MSB is latched by the first word register 10A by a control clock supplied from outside and is latched at a predetermined timing by an address register 11. The lowest order bit of the MSB is exclusive-OR ed with an input data of the next byte word register 10B by means of an exclusive OR (EX-OR) circuit.

Therefore, if the lowest order bit of the MSB is "1" indicating an odd number, data "0" or "1" of the 2SB data is converted to "1" or "0", respectively, by the exclusive OR circuit, so that a complement indicated by the negative logic Gray code is supplied to the second word register 10B.

In a similar manner, the lowest order bit of the sequentially higher order digit is detected by the exclusive OR circuit to check if the upper order digit number is an even number or an odd number, whilst the lower order digit word data are stored in word registers 10C, 10D and 10E, respectively, either directly or after conversion into complements, so that the outputs of the word registers are latched by address register 11 for detecting the track addresses of the sector read out during seeking of the magneto-optical disc.

Since the transition in the Gray code data indicating the track address is one bit between the neighboring tracks, the detected value of the address register 11 produced during traversing indicates the track position during traversing with high accuracy.

Meanwhile, the lowest order digit of the track address data may be set so as to be equal to the access code (Gray code) recorded in each servo byte area SB.

Figure 6:
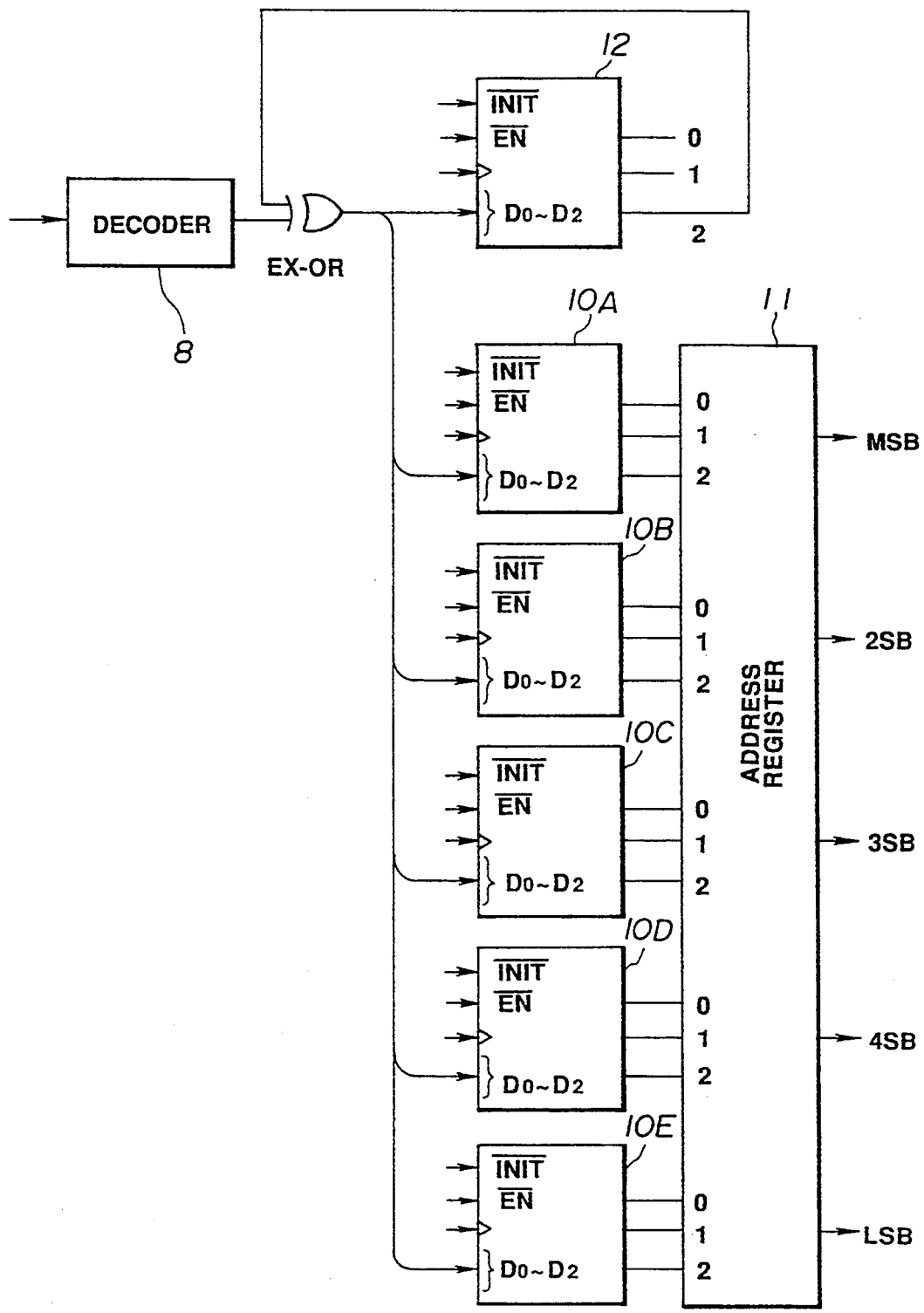
FIG. 6 is a block diagram showing a modified readout circuit for reading out the track address recorded on the optical disc of the present invention.

FIG. 6 shows a modification of the address code detector 10 shown in FIG. 2. In FIG. 6, the portions which are the same as those of FIG. 2 are indicated by the same reference numerals.

12 denotes a decision register for sequentially latching and storing the binary code data of the respective digits as converted by the decoder 8.

The decision register 12 and the word registers 10A to 10E are initialized by control signals inputted at INIT terminals. On the other hand, word-by-word code data are loaded by control signals inputted at EN terminals and the lowest order bit of the respective preceding word is supplied to the exclusive OR (EX-OR) circuit.

The binary signal of the lowest order digit is inverted and converted into a complement, depending on whether or not the word of the upper order digit is an even number, and the inverted data are supplied to the registers 10A to 10E of the respective digits.

Figure 7:
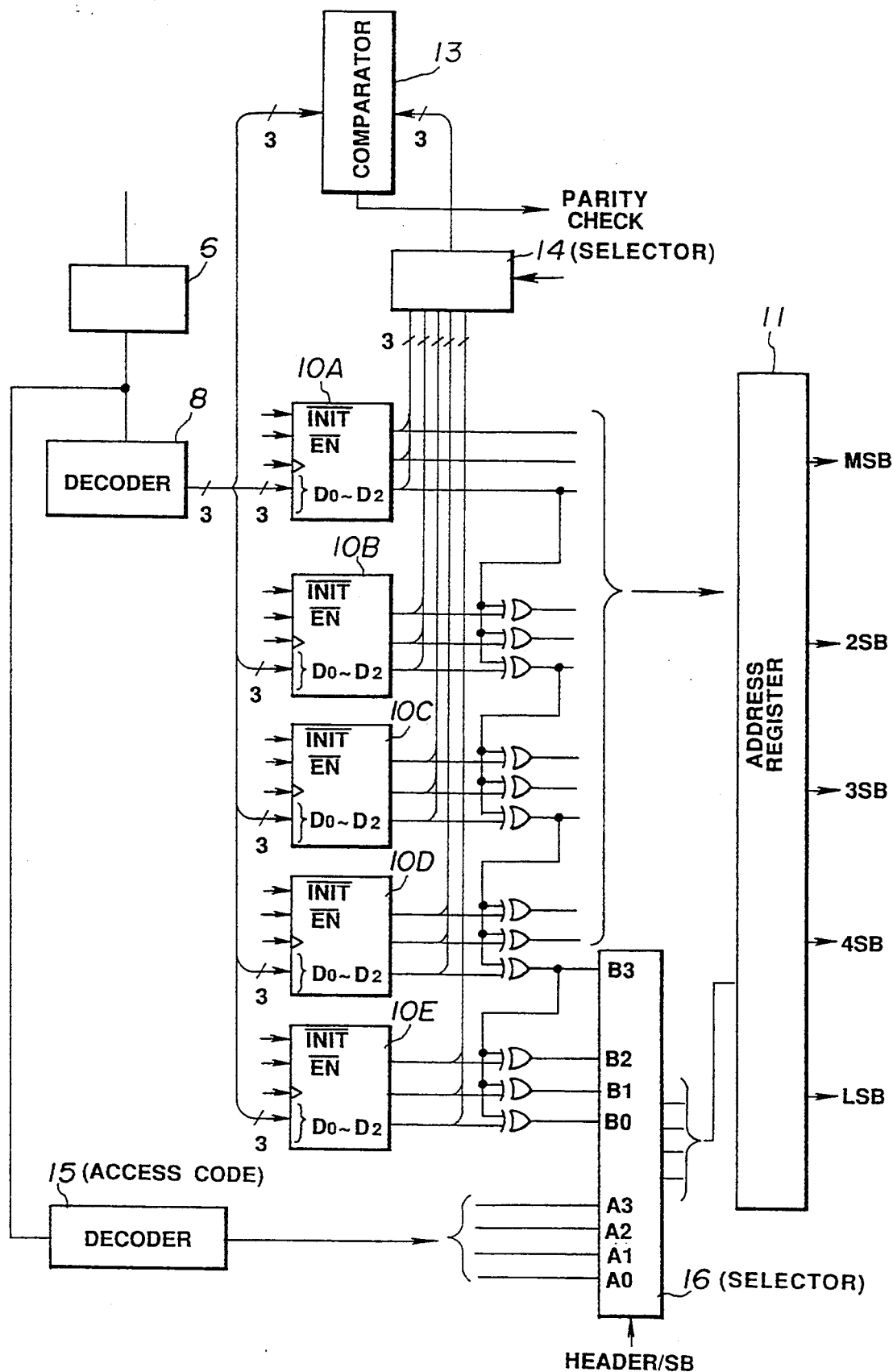
FIG. 7 is a block diagram of a track address detecting circuit capable of carrying out parity check of the Gray code.
Figure 2:
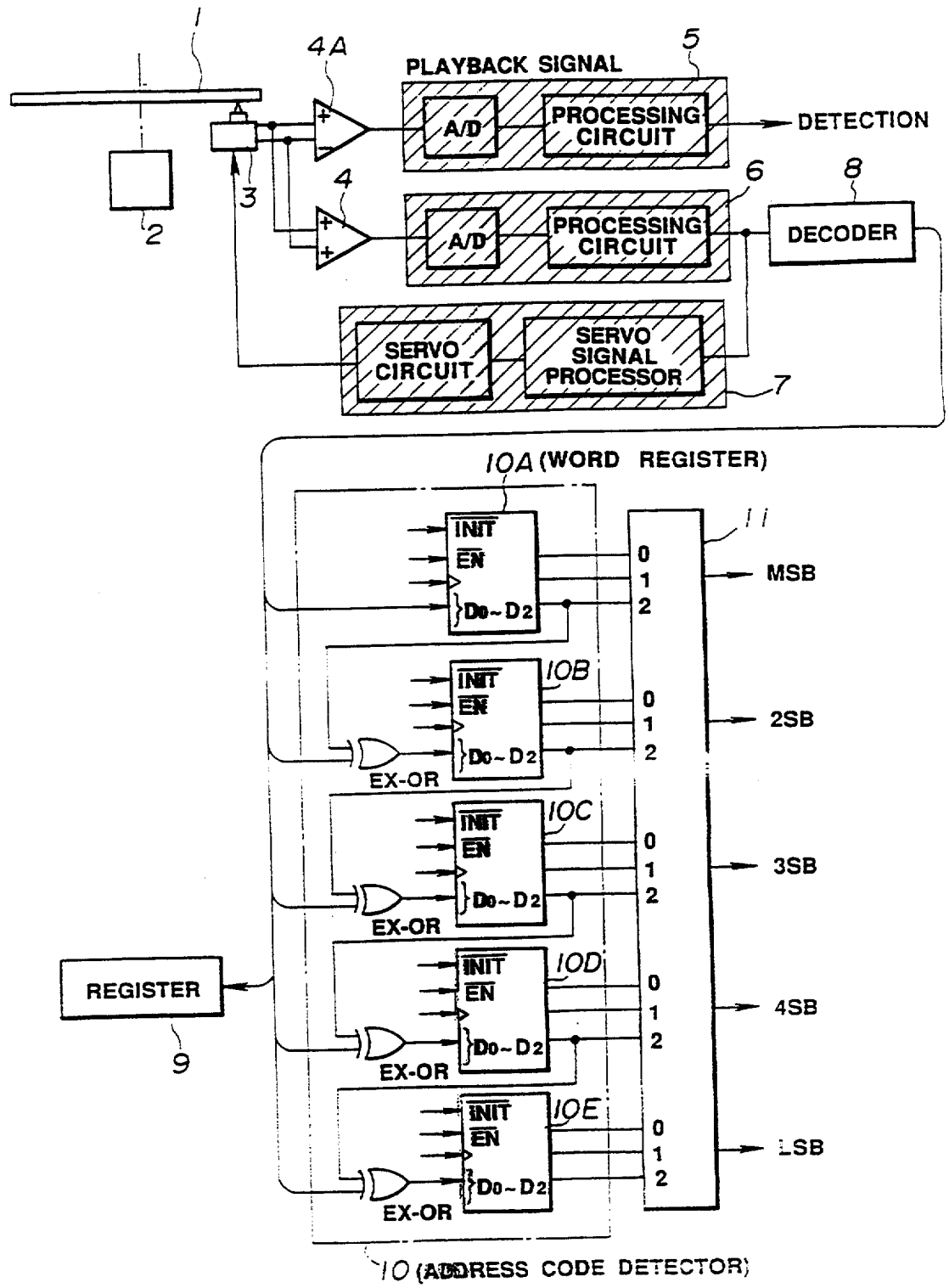

FIG. 7 shows a modified embodiment in which the position of the track being traversed may be detected as the Gray code data stored in the optical disc of the present invention is read. In FIG. 7, the portions which are the same as those of FIG. 2 are indicated by the same reference numerals.

In the present modification, a comparator 13 compares the negative logic data recorded on the track address 2 of the header/1 shown in FIG. 1 with the positive logic data recorded in the track address 1 for detecting the presence or absence of errors in the readout data.

A first selector circuit 14 selects the output data of the first to fifth word registers 10A to 10E at a predetermined timing. The selected data are supplied to the comparator 13 at the readout timing of the track address 2.

Meanwhile, a decoder 15 converts the hexadecimal Gray code data recorded in the servo byte area SB into binary data. The 4-bit output data $A_0$ to $A_3$ of the decoder 15 are supplied to a second selector 16.

To this second selector 16, 4 lower order bits $B_0$ to $B_3$ of data indicating the track address are supplied and changed over between the head area and the servo byte area before being supplied to the address register 11.

Meanwhile, exclusive OR circuits for converting data obtained from the Gray code of a given digit into complements depending on whether the digit on the higher order side thereof is an odd number or an even number, are provided at output sides of the word registers 10A to 10E, as in the preceding embodiment.

Although the track address indicating the track position is outputted from the address information adopted with the optical disc has been explained in the above, a track address detection circuit having a different circuit arrangement may be used in the optical disc of the present invention for extracting the track address.

In addition, although the Gray code of the lower order digits is of the negative logic when the upper order digit of the track address is an odd number, in the above description, the lower order digit Gray code may be recorded in the negative logic when the upper order digit Gray code is an even number.

FIG. 8 shows a modification of the manner of encoding the track addresses by the Gray code. Thus, FIGS. 8a and 8b show an array pattern of the positive logic Gray code and an array pattern of the negative logic Gray code in which the base-4 Gray code is constituted by the 1 out of 4 code, respectively.

Although the Gray code of the present modification cannot be said to represent a complete Gray code if seen at the level of the respective digits, if the Gray code is to be the word code of the respective positions of the track address data, the Gray code which differs only one bit between the neighboring tracks may be completed, as shown in FIG. 8c.

The base of the Gray code pattern of the present invention may be other than 4 or 8, while the pattern of the Gray code may be selected optionally.

As described above, it is possible with the optical disc of the present invention to read out the track information satisfactorily with high speed seeking by encoding the address information in the Gray code.

Since the Gray code arraying pattern is constituted by the pattern array of the positive logic and the array pattern of the negative logic, and the respective patterns are systematically changed depending on if the upper order digit data is an odd number or an even number, the address information with the larger number of digits may be easily encoded by the Gray code. Besides, since the code is completely the Gray code not only partially but also as a whole, there is only little risk of address data readout errors.

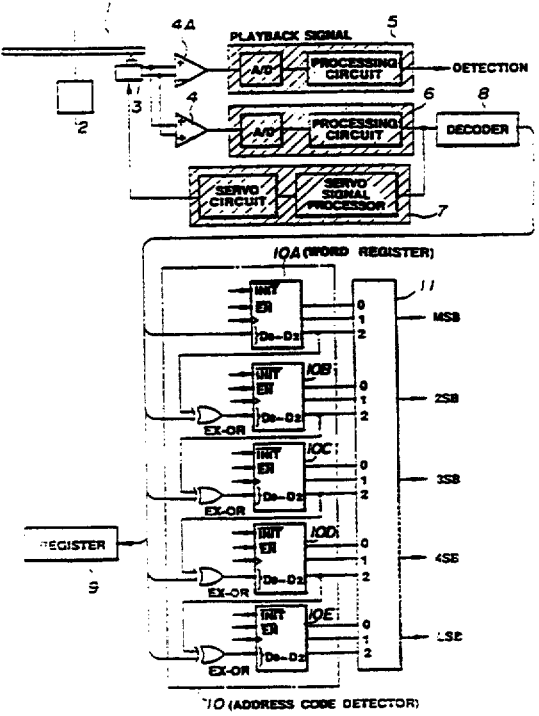

What is claimed is:

1. A disc-shaped recording medium comprising:
   a recording surface having one of either concentric recording tracks or a spiral recording track, each track being divided circumferentially to form a plurality of sectors in each of which track addresses are pre-recorded, wherein
   each digit of the track address is formed by a base-m Gray code, and
   each digit is sequentially formed so that a Gray code of positive logic is used where a next highest order digit has the value of an even number and a Gray code of negative logic is used where the next highest order digit has the value of an odd number.

2. A disc-shaped recording medium as claimed in claim 1 further wherein a segment is formed by dividing each sector and a Gray code which is the same as the lowest order digit of the track address is pre-recorded on the recording surface.

3. A disc-shaped recording medium comprising:
   a recording surface having one of either concentric recording tracks or a spiral recording track, each track being divided circumferentially to form a plurality of sectors in each of which track addresses are pre-recorded, wherein
   each position of the track address is formed by a base-m Gray code, and
   each digit is sequentially formed so that a Gray code of positive logic is used where a next highest order digit has the value of an odd number and a Gray code of negative logic is used where the next highest order digit has the value of an even number.

4. A disc-shaped recording medium as claimed in claim 3 further wherein a segment is formed by dividing each sector and a Gray code which is the same as the lowest order digit of the track address is pre-recorded.

5. An apparatus for reproducing a disc-shaped recording medium in which each one of a plurality of concentric recording tracks or a spiral recording track is divided circumferentially to form a plurality of sectors, in which each digit of a track address is formed by a base-m Gray code, and in which each digit is sequentially formed so that a Gray code of positive logic is used where a next highest order digit has the value of an even number and a Gray code of negative logic is used where the next highest order digit has the value of an odd number, comprising:
   means for reproducing the Gray code from the disc-shaped recording medium,
   an address decoder supplied with the reproduced Gray code for converting the reproduced Gray code into binary address code, and
   address code detection means for detecting the address code obtained from the address decoder for each digit, inverting the address code when a detected lowest order bit of the next highest digit is an odd number, and outputting a track address.

6. An apparatus for reproducing a disc-shaped recording medium in which each one of a plurality of concentric recording tracks or a spiral recording track is divided circumferentially to form a plurality of sectors, in which each digit of a track address is formed by a base-m Gray code, and in which each digit is sequentially formed so that a Gray code of positive logic is used where a next highest order digit has the value of an odd number and a Gray code of negative logic is used where the next highest order digit has the value of an even number, comprising:
   means for reproducing the Gray code from the disc-shaped recording medium,
   an address decoder supplied with the reproduced Gray code for converting the reproduced Gray code into binary address code, and
   address code detection means for detecting the address code obtained from the address decoder for each digit, inverting the address code when a detected lowest order bit of the next highest digit is an even number, and outputting a track address.

7. In combination, a disc-shaped recording medium and an apparatus for reproducing signals recorded on the disc-shaped recording medium, comprising:
   a recording surface on the disc-shaped recording medium in which each one of a plurality of concentric recording tracks or a spiral recording track is divided circumferentially to form a plurality of sectors, in which each digit of a track address is formed by a base-m Gray code, and in which each digit is sequentially formed so that a Gray code of positive logic is used where a next highest order digit has the value of an even number and a Gray code of negative logic is used where the next highest order digit has the value of an odd number
   reproducing means for reproducing the Gray code from the disc-shaped recording medium,
   an address decoder connected to the reproducing means and supplied with the reproduced Gray code for converting the reproduced Gray code into a binary address code, and
   address code detection means for detecting the address code obtained from the address decoder for each digit, inverting the address code when a detected lowest order bit of the next highest digit is an odd number, and outputting a track address.

8. In combination, a disc-shaped recording medium and an apparatus for reproducing signals recorded on the disc-shaped recording medium, comprising:
   a recording surface on the disc-shaped recording medium in which each one of a plurality of concentric recording tracks or a spiral recording track is divided circumferentially to form a plurality of sectors, in which each digit of a track address is formed by a base-m Gray code, and in which each digit is sequentially formed so that a Gray code of positive logic is used where a next highest order digit has the value of an odd number and a Gray code of negative logic is used where the next highest order digit has the value of an even number,
   reproducing means for reproducing the Gray code from the disc-shaped recording medium,
   an address decoder connected to the reproducing means and supplied with the reproduced Gray code for converting the reproduced Gray code into a binary address code, and
   address code detection means for detecting the address code obtained from the address decoder for each digit, inverting the address code when a detected lowest order bit of the next highest digit is an even number, and outputting a track address.

* * * * *

UNITED STATES PATENT AND TRADEMARK OFFICE
CERTIFICATE OF CORRECTION

PATENT NO. : 5,418,768
DATED : May 23, 1995
INVENTOR(S) : Susumu Senshu

It is certified that error appears in the above-indentified patent and that said Letters Patent is hereby corrected as shown below:

The title page, should be deleted to appear as per attached title page.

The sheet of drawing consisting of figure 2, should be deleted to appear as per attached figure 2.

Signed and Sealed this

Sixteenth Day of April, 1996

Attest:

BRUCE LEHMAN

Attesting Officer

Commissioner of Patents and Trademarks

United States Patent [19]

Senshu

[11] Patent Number: 5,418,768
[45] Date of Patent: May 23, 1995

[54] DISC-SHAPED RECORDING MEDIUM AND APPARATUS FOR REPRODUCING TRACK ADDRESSES RECORDED ON THE DISC-SHAPED RECORDING MEDIUM

[75] Inventor: Susumu Senshu, Kanagawa, Japan

[73] Assignee: Sony Corporation, Tokyo, Japan

[21] Appl. No.: 210,081

[22] Filed: Mar. 17, 1994

Related U.S. Application Data

[63] Continuation of Ser. No. 889,666, May 28, 1992, abandoned.

Foreign Application Priority Data

Jun. 7, 1991 [JP] Japan .................. 3-162511

[51] Int. Cl.⁶ .................. G11B 15/52
[52] U.S. Cl. .................. 369/59; 369/275.3
[58] Field of Search .................. 369/59, 32, 50, 54, 369/275.3; 360/78.01, 78.04, 78.08, 78.14, 77.08

[56] References Cited

U.S. PATENT DOCUMENTS

| | | | |
|---|---|---|---|
| 4,677,606 | 6/1987 | Ogata et al. | 369/59 |
| 4,823,212 | 4/1989 | Knowles et al. | 360/77.08 |
| 4,924,160 | 5/1990 | Tung | 360/78.07 |
| 4,925,717 | 5/1990 | Tsukamura et al. | |

FOREIGN PATENT DOCUMENTS

0404942A1 1/1991 European Pat. Off. .... G11B 21/10

Primary Examiner—Georgia Y. Epps
Assistant Examiner—P. W. Huber
Attorney, Agent, or Firm—Limbach & Limbach; Philip M. Shaw, Jr.

[57] ABSTRACT

A disc-shaped recording medium in which concentric recording tracks or a spiral recording track is divided circumferentially to form a number of sectors in each of which track addresses are pre-recorded, wherein each position of the track address is formed by a base-m Gray code, and wherein each position is sequentially formed so that the Gray code of positive or negative logic and a negative logic is used for the upper order digit having the value of an even or odd number and the upper order digit having the value of an odd number, respectively.

8 Claims, 7 Drawing Sheets